(12) United States Patent
Chen et al.

(10) Patent No.: US 12,485,490 B2
(45) Date of Patent: Dec. 2, 2025

(54) ULTRA-HIGH SPEED LASER CLADDING BASED ON DOUBLE PRESSING OF MAGNETIC FORCE AND CENTRIFUGAL FORCE APPARATUS AND METHOD

(71) Applicant: JIANGSU UNIVERSITY, Zhenjiang (CN)

(72) Inventors: Lan Chen, Zhenjiang (CN); Xudong Ren, Zhenjiang (CN); Tong Ge, Zhenjiang (CN); Xinzhou Zhang, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 946 days.

(21) Appl. No.: 17/670,421

(22) Filed: Feb. 11, 2022

(65) Prior Publication Data

US 2023/0182209 A1 Jun. 15, 2023

(30) Foreign Application Priority Data

Dec. 9, 2021 (CN) .......................... 202111500743.1

(51) Int. Cl.
*B22F 12/45* (2021.01)
*B22F 10/28* (2021.01)
(Continued)

(52) U.S. Cl.
CPC .............. *B22F 12/45* (2021.01); *B22F 10/28* (2021.01); *B23K 26/0608* (2013.01);
(Continued)

(58) Field of Classification Search
CPC ...... B22F 12/45; B22F 10/28; B22F 2999/00; B22F 10/25; B22F 12/226; B22F 12/90;
(Continued)

(56) References Cited

U.S. PATENT DOCUMENTS

| 2017/0106477 | A1* | 4/2017 | Mironets | ............... | B22F 12/224 |
| 2019/0160539 | A1* | 5/2019 | Lei | ......................... | B33Y 10/00 |
| 2019/0331929 | A1* | 10/2019 | Shi | ..................... | B23K 26/0643 |

FOREIGN PATENT DOCUMENTS

| CN | 102409338 | A | * | 4/2012 | | |
| CN | 106271046 | A | * | 1/2017 | ......... | B23K 26/0676 |
| CN | 113046743 | A | * | 6/2021 | ............. | C23C 24/10 |

* cited by examiner

*Primary Examiner* — Edward F Landrum
*Assistant Examiner* — Maurisa D Morris
(74) *Attorney, Agent, or Firm* — Bayramoglu Law Offices LLC

(57) ABSTRACT

An ultra-high speed laser cladding device and a process based on the dual suppression of magnetic force and centrifugal force are provided, including a laser generator, a spectrometer, a powder device, a rotary tool and a magnetic field generator. The substrate is installed in the rotary tooling, through the driving device to rotate it. The magnetic field generator is used to generate a magnetic field in the rotary cylinder. The laser generator produces the first laser beam and the second laser beam with different energy through the spectrometer. They are both focused on the surface of the substrate. The powder conveyed by the powder device is sprayed to the surface of the substrate, laser cladded by the first laser beam and the second laser beam. The gas can quickly escape to ensure the density of the cladding layer and reduce the porosity.

14 Claims, 7 Drawing Sheets

(51) Int. Cl.
  *B23K 26/06* (2014.01)
  *B23K 26/08* (2014.01)
  *B23K 26/342* (2014.01)
  *B33Y 10/00* (2015.01)
  *B33Y 30/00* (2015.01)
  *H01F 7/20* (2006.01)

(52) U.S. Cl.
  CPC ........ *B23K 26/0823* (2013.01); *B23K 26/342* (2015.10); *B33Y 10/00* (2014.12); *B33Y 30/00* (2014.12); *H01F 7/20* (2013.01)

(58) Field of Classification Search
  CPC ............ B23K 26/0608; B23K 26/0823; B23K 26/342; B23K 26/144; B33Y 10/00; B33Y 30/00; H01F 7/20
  USPC .......................................................... 219/121
  See application file for complete search history.

ULTRA-HIGH SPEED LASER CLADDING BASED ON DOUBLE PRESSING OF MAGNETIC FORCE AND CENTRIFUGAL FORCE APPARATUS AND METHOD

CROSS REFERENCE TO THE RELATED APPLICATIONS

This application is based upon and claims priority to Chinese Patent Application No. 202111500743.1, filed on Dec. 9, 2021, the entire contents of which are incorporated herein by reference.

TECHNICAL FIELD

The present invention relates to the field of laser cladding technology, in particular to an ultra-high speed laser cladding device based on magnetic force and centrifugal force double pressing.

BACKGROUND

The ultra-high speed laser cladding technology is a new surface coating technology developed by researchers from Fraunhofer ILT and RWTH Aachen University of technology in 2017. Based on the optimal design of coaxial powder feeding nozzle, ultra-high speed laser cladding technology realizes the optimal coupling between powder particles and laser beam. Under the action of high-energy density laser beam, the powders and the high-speed moving substrate surface are melted at the same time. After rapid solidification, a cladding layer with high-strength metallurgical combination with the substrate is formed, which greatly improves the cladding rate and breaks through the efficiency bottleneck of traditional cladding.

At present, the processing objects of ultra-high speed laser cladding are mostly shaft and disk parts. The ultra-high cladding speed is obtained by the rotation of the workpiece. This processing method has large centrifugal force. And the prepared cladding layer has defects such as pores. This technology has not been applied in the field of workpiece inner wall. At the same time, because the basic research in the preparation process is not perfect, the ultra-high speed laser cladding technology is still in the stage of popularization and application. There is still a lot of work to be completed in the aspects of forming accuracy and defect control.

SUMMARY

In view of the shortcomings of the existing technology, the present invention provides an ultra-high speed laser cladding device based on magnetic force and centrifugal force double pressing, which realizes ultra-high speed laser pressing cladding on the inner wall of the cylinder through the cooperation of magnetic field and centrifugal force. At the same time, in the laser cladding, turning on the high-speed camera is to detect the laser cladding process in real time and dynamically adjust the process parameters to achieve the purpose of preparing defect free high-performance metal components. An auxiliary laser head is added to form a large rectangular light spot in the cladding process, which is matched with the small light spot of the main cladding head. The overlapping part of the light spot can provide high energy to promote powder melting and improve the cladding efficiency. The non-overlapping part can preheat the substrate and reduce the temperature gradient and the residual stress of the cladding layer. It can also remelt and repair the cladding layer in the multi-channel cladding process to improve the quality of the cladding layer. In addition, the device and method proposed by the present invention can also expand the existing ultra-high speed laser cladding two-dimensional additive technology to ultra-high speed laser deposition three-dimensional additive technology which can make up for the shortcomings of the efficiency and accuracy of the traditional technology. This method can broaden the application scope of ultra-high speed laser deposition technology and promote its popularization and application.

The present invention realizes the technical purpose through the following technical means.

An ultra-high speed laser cladding device is based on magnetic force and centrifugal force double suppression, including a laser generator, a spectrometer, a powder device, a rotary cylinder and a magnetic field generator;

The rotary cylinder is rotated through a driving device, and the substrate is installed on the rotary cylinder. The magnetic field generator is used to generate a magnetic field in the rotary cylinder. The laser generator produces the first laser beam and the second laser beam with different energy through the spectrometer. They are both focused on the surface of the substrate. The powder conveyed by the powder device is sprayed to the surface of the substrate and cladded by the first laser beam and second laser beam.

Further, the first spot area formed by the first laser beam through the main cladding head output is less than the second spot area formed by the second laser beam through the auxiliary laser head. The first spot energy is greater than the second spot energy. The overlapped part of the second light spot and the first light spot is used to promote powder melting. And the non-overlapped part of them is used to pre-heat the substrate.

Further, the first laser beam output through the main cladding head forms a circular light spot, the second laser beam output through the auxiliary laser head forms a rectangular light spot. The rectangular light spot covers the circular light spot.

Further, under the action of the first laser beam and the second laser beam, molten powder forms a molten pool on the surface of the substrate. The molten pool is compressed under the dual action of lorentz force generated by magnetic field and centrifugal force generated by rotation, which is used to form a molten pool with high density and compact structure.

Further, the bottom surface of the rotary cylinder is evenly distributed a plurality of through holes for powder falling. The powder collecting groove is arranged below the through hole, and the powder is gathered into the powder collecting groove through the bracket with taper. A filter net is arranged above the powder collecting groove for filtering the residue generated during the cladding process.

Further, the spectrometer is installed on the mobile platform through the lifting mechanism. The magnetic field generator includes an annular coil, which is wound outside the rotary cylinder to electrify the annular coil and generate a magnetic field in the rotary cylinder.

Further, substrates are uniformly installed in the rotary cylinder for synchronous processing of multiple parts. The rotation speed of the rotary cylinder is not less than 1200 rpm.

A process of ultra-high speed laser cladding device is based on magnetic force and centrifugal force double pressing includes the following steps:

The substrate is installed in the rotary cylinder.

Adjusting the position of the auxiliary laser head, so that the second spot is focused on the surface of the substrate for preheating the substrate.

Adjusting the position of the main cladding head, so that the first spot is focused on the surface of the substrate, and the first spot overlaps with the second spot. The powder device is sprayed to the surface of the substrate. And the powder is fused on the surface of the substrate through the overlap of the second spot and the first spot. The rotary cylinder is driven to rotate by a driving device. At the same time, the magnetic field generator generates a magnetic field in the rotary cylinder. Under the dual action of Lorentz force generated by the magnetic field and centrifugal force generated by rotation, the molten pool on the surface of the substrate is compressed, forming a molten pool with high density and compact structure.

Further, it includes the following steps:

The control system uses image recognition technology to determine whether the powder is melting enough. If the powder melting does not meet the setting requirements, the control system controls the rotary cylinder to reduce the speed.

Further, under the dual action of Lorentz force generated by magnetic field and centrifugal force generated by rotation, the height ΔH of the molten pool pressed on the substrate surface is expressed as:

$$\Delta H = \frac{F_{Lorenz} + F_{Centrifugal} - \frac{K(T_c - T)}{\left(\frac{M}{\rho}\right)^{2/3}}}{\rho g}$$

Among them:

$F_{Lorenz}$ is Lorentz force generated by magnetic field.
$F_{Centrifugal}$ is the centrifugal force generated by rotating.
K is constant.
$T_c$ is the critical temperature.
M is the atomic weight of powder particle.
ρ is the melt density.
T is the molten pool temperature.

The present invention has the following beneficial effects.

1. Compared with traditional laser cladding additive manufacturing, the ultra-high speed laser cladding device based on double pressing of magnetic force and centrifugal force has changed the form of obtaining scanning speed. Traditional laser cladding additive manufacturing achieves different speeds of cladding by the movement of cladding head. But this device can obtain scanning speed through the rotation of rotary cylinder. The scanning speed can be more than 1200 rpm.

2. The ultra-high speed laser cladding device based on the double pressing of magnetic force and centrifugal force can cladding the whole annular parts or multiple similar parts at the same time by installing a plurality of substrate or directly installing the annular substrate in the rotary cylinder, greatly improving the production efficiency. At the same time, the device can be used for both multi-layer laser cladding and multi-channel laser cladding additive manufacturing, which can extend the existing ultra-high speed laser cladding two-dimensional additive technology to ultra-high speed laser deposition three-dimensional additive technology.

3. The ultra-high speed laser cladding device based on magnetic force and centrifugal force compresses the molten pool under the dual action of lorentz force generated by magnetic field and centrifugal force generated by rotation. Under the double extrusion action of centrifugal force and magnetic force, the gas escapes quickly to ensure the density of the cladding layer and reduce the porosity, which overcomes the adverse influence of centrifugal force in the ultra-high speed laser cladding processing of shaft or disk parts.

4. The ultra-high speed laser cladding device based on the double suppression of magnetic force and centrifugal force. The area of the first spot formed by the first laser beam output through the main cladding head is smaller than the area of the second spot formed by the second laser beam output through the auxiliary laser head. And the energy of the first spot is greater than the energy of the second spot. The overlap part of the second light spot and the first light spot is used to promote powder melting and improve the cladding efficiency. The non-overlapping part of the second spot and the first spot is used for pre-heating the substrate, reducing the temperature gradient, reducing the residual stress of the cladding layer, and repairing the cladding layer in the process of multi-channel cladding, improving the quality of the cladding layer.

5. The present invention relates to an ultra-high speed laser cladding device based on magnetic and centrifugal force double suppression. The bottom of the rotary cylinder is evenly distributed through holes for powder falling. The bracket is arranged into slope shape, smooth surface, convenient for powder to gather in the powder collecting groove. A filter net is arranged above the powder collecting groove to form a powder collecting system, which is conducive to powder recovery and utilization.

1—Laser generator; 2—Air pump; 3—Powder device; 4—Annular coil; 5—Control system; 6—Electric slide rail; 7—Electric slider; 8—Lifting mechanism; 9—Spectrometer; 10—High-speed camera; 11—Auxiliary laser head; 12—Main cladding head; 13—Substrate; 14—Rotary cylinder; 15—Bracket; 16—Mounting bracket; 17—Deceleration clutch; 18—Filter net; 19—Servo motor; 20—Synchronous belt; 21—Powder collecting groove.

DETAILED DESCRIPTION OF THE EMBODIMENTS

The present invention is further explained below in combination with the attached drawings and concrete embodiments. But the scope of protection of the present invention is not limited to this.

Embodiments of the present invention are described in detail below, and examples of said embodiments are shown in attached drawings where identical or similar labels throughout indicate identical or similar elements or elements having the same or similar function. The embodiments described below by reference to the attached drawings are illustrative and are intended to explain the present invention and are not to be understood as a limitation of the present invention.

In the description of the present invention, the need to understand is that the term "the center", "vertical", "horizontal", "length", "width", "thickness" and "up", "down", "axis", "radial", "vertical", "level", "inside" and "outside" indicates a location or position relations based on the location or position shown in the appended drawings. Only for the convenience of describing the present invention and simplifying the description, and not to indicate or imply that the device or component referred to must have, be constructed and operated in a particular orientation, and shall not be construed as a limitation of the present invention. In addition, the terms "first" and "second" are used for descriptive purposes only and are not to be understood to indicate or imply relative importance or to indicate implicitly the quantity of indicated technical features. Thus, features that are qualified as "first" or "second" may include, explicitly or implicitly, one or more of these features. In the description of the present invention, "multiple" means two or more, unless otherwise expressly and specifically qualified.

In the present invention, the terms "install", "connect", "connect", "fix" and so on shall be understood in a broad sense, unless otherwise expressly specified and qualified. For example, it can be a fixed connection, a detachable connection, or an integrated connection. It can be mechanical or electrical. It can be directly connected or indirectly connected through an intermediary. It can be connected within two components. For ordinary technicians in the field, the specific meanings of the above terms in the present invention can be understood according to the specific circumstances.

Figure 1:
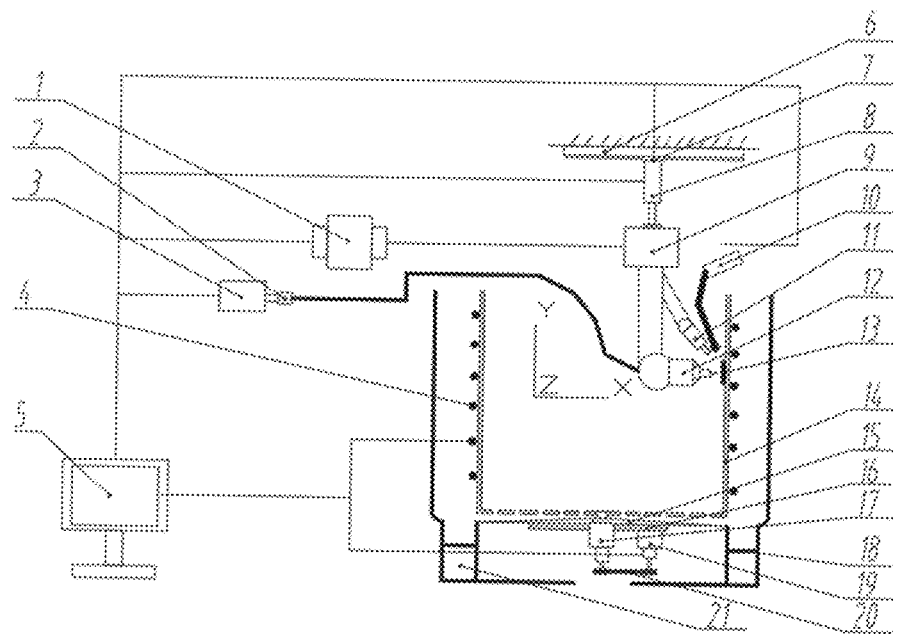
FIG. 1: The schematic diagram of the ultra-high speed laser cladding device based on the double suppression of magnetic force and centrifugal force.

As shown in FIG. 1, the ultra-high speed laser cladding device based on the double suppression of magnetic force and centrifugal force includes laser generator 1, spectrometer 9, powder device, rotary cylinder 14 and magnetic field generator.

The laser generator 1 through the spectrometer 9 produce different energy of the first laser beam and the second laser beam. The first laser beam through the main cladding head 12 output forms the first spot and the second laser beam through the auxiliary laser head 11 output forms the second spot. The spectrometer 9 is installed on the lifting mechanism 8, to achieve the height of the spectrometer 9 direction of movement. The lifting mechanism 8 is installed on the electric slide rail 6 which can be moved horizontally through the electric slider 7 and can realize the movement of the spectrometer 9 along the X axis or Y axis. The auxiliary laser head 11 and the main cladding head 12 are wrist joint structures, which can rotate at a small Angle.

Figure 2:
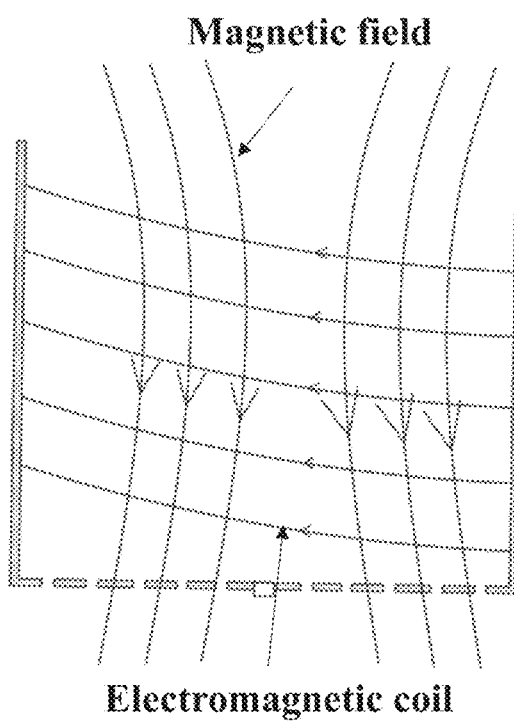
FIG. 2: The electromagnetic coil schematic diagram of the present invention.
Figure 3:
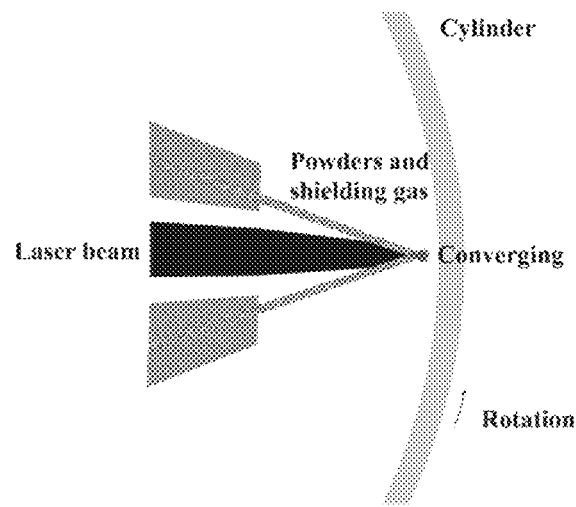
FIG. 3: Schematic diagram of powder aggregation during laser cladding.
Figure 4:
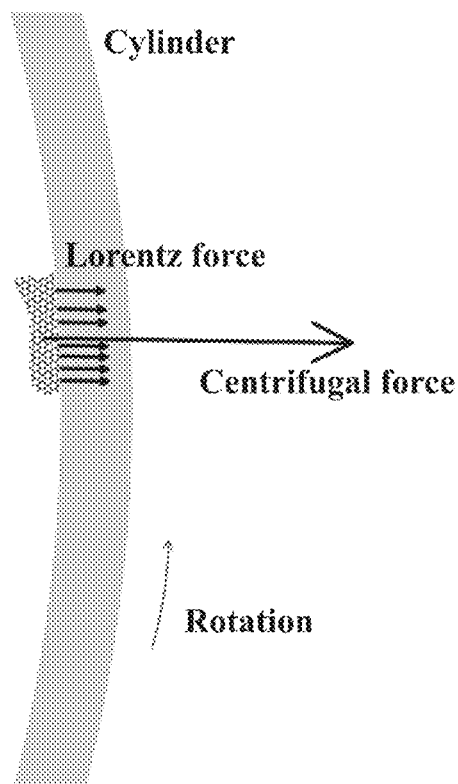
FIG. 4: Force analysis diagram of molten powder reaching wall surface.
Figure 5:
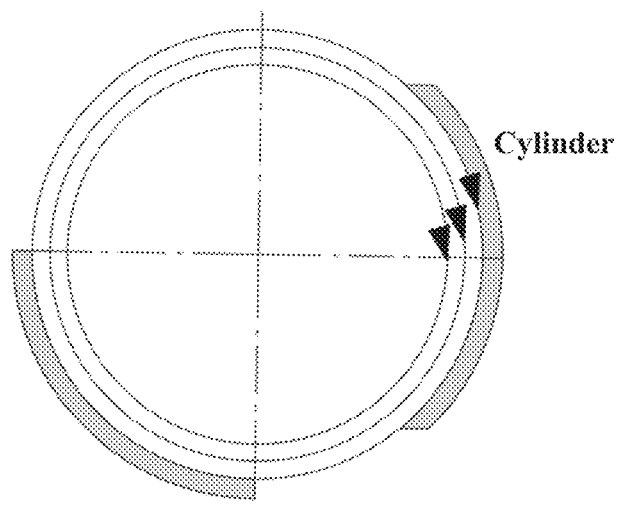
FIG. 5: Trajectory diagram of laser multilayer pressing cladding.

The substrate 13 is installed in the rotary cylinder 14, through the driving device to rotate the rotary cylinder 14. Deceleration clutch 17, servo motor 19 and synchronous belt 20 constitute the driving device. The magnetic field generator includes an annular coil 4. The annular coil 4 is wound outside the rotary cylinder 14 to make the annular coil 4 energized and used to generate a magnetic field in the rotary cylinder 14. As shown in FIG. 2, the powder conveyed by the powder device is sprayed to the surface of the substrate 13 is laser cladded by a first laser beam and a second laser beam. The powder device includes an air pump 2 and a powder device 3. Powder is sent from powder device 3 to main cladding head 12 for final cladding by air pump 2. As shown in FIGS. 3, 4 and 5, molten powder forms a molten pool on the surface of substrate 13 under the action of the first laser beam and the second laser beam. The annular coil 4 constructs a magnetic field down the magnetic induction line, rotates the rotary cylinder 14 counterclockwise. After the molten powder reaches the surface of substrate 13, the molten pool is compressed by Lorentz force and centrifugal force, which is used to form the molten pool with high density and compact structure. Under the double extrusion action of centrifugal force and magnetic force, the gas escapes quickly to ensure the density of the cladding layer and reduce the porosity, which overcomes the adverse influence of centrifugal force in the ultra-high speed laser cladding processing of shaft or disk parts.

Figure 8:
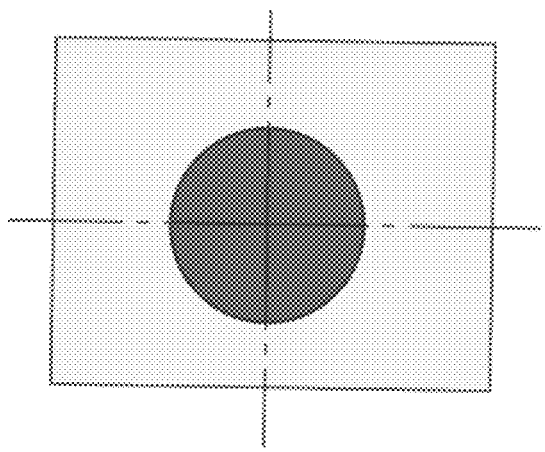
FIG. 8: Overlap diagram of rectangular and circular spots.

As shown in FIG. 8, the area of the first spot formed by the first laser beam output through the main cladding head 12 is smaller than the area of the second spot formed by the second laser beam output through the auxiliary laser head 11. And the energy of the first spot is greater than the energy of the second spot. The overlap part of the second light spot and the first light spot is used to promote powder melting and improve the cladding efficiency. The non-overlapping part of the second spot and the first spot is used for pre-heating the substrate, reducing the temperature gradient and the residual stress of the cladding layer, and repairing the cladding layer in the process of multi-channel cladding, improving the quality of the cladding layer. The first laser beam forms a circular light spot through the main cladding head 12 output, and the second laser beam forms a rectangular light spot through the auxiliary laser head 11 output, and the rectangular light spot covers the circular light spot.

The laser generator 1, air pump 2, annular coil 4, electric slider 7, lifting mechanism 8, auxiliary laser head 11, the main cladding head 12, servo motor 19 and high-speed camera 10 through the signal line and control system 5, and by its control. High-speed camera 10 is aimed at the molten pool to obtain the powder fusion state.

Figure 9:
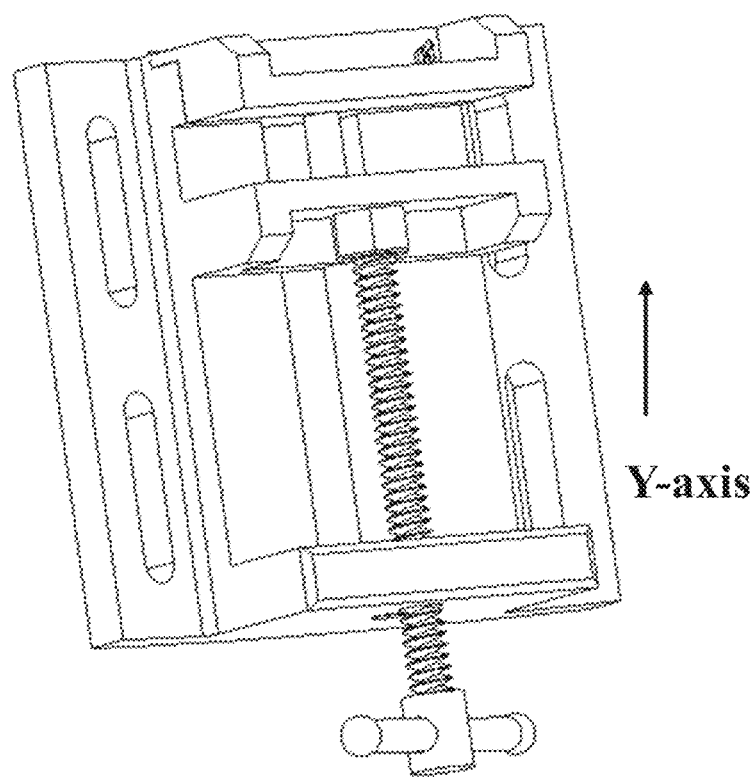
FIG. 9: Fixture model drawing and installation direction.

A plurality of substrate 13 can be installed on the rotary cylinder 14 by means of a fixture, which can melt multiple parts at a time, greatly improving the production efficiency. The fixture is shown in FIG. 9.

The bottom surface of the rotary cylinder 14 is evenly distributed a plurality of through holes for powder falling. The powder collecting groove 21 is arranged below the through hole, and the powder is aggregated into the powder collecting groove 21 through the bracket 15 with a taper. A filter net 18 is arranged above the powder collecting groove 21 for filtering the residue generated during the cladding process.

Figure 7:
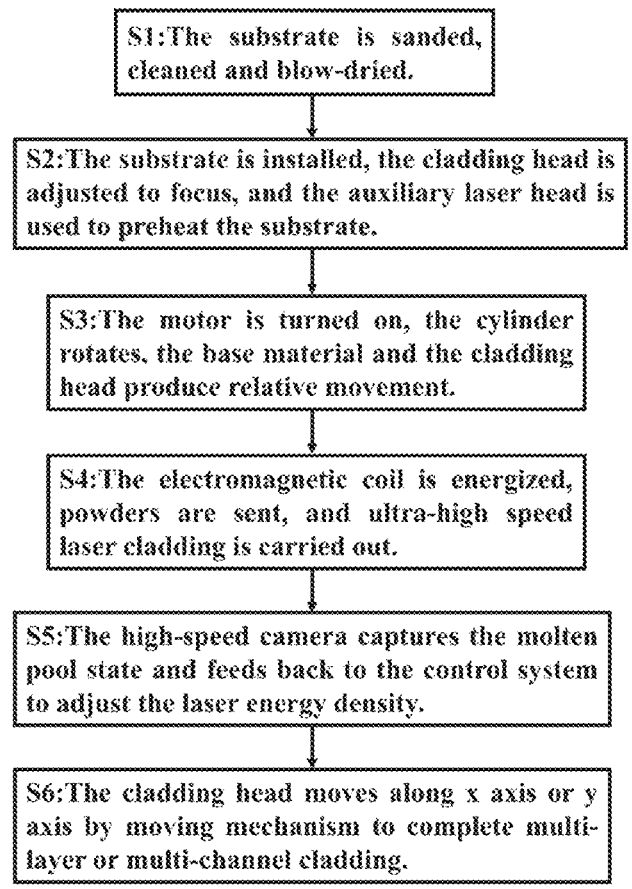
FIG. 7: The ultra-high speed laser cladding process flow chart based on the double suppression of magnetic force and centrifugal force.

The TiC/Inconel625 alloy is taken as an example to carry out a simple annular inner wall multi-channel cladding. The ultra-high speed laser cladding process described in the present invention is based on double pressing of magnetic force and centrifugal force, as shown in FIG. 7, which includes the following steps:

A. Grinding, cleaning and drying the substrate 13:

B. The substrate 13 is fixed on the rotary cylinder 14. The Angle position of the auxiliary laser head 11 is adjusted to focus the second spot on the surface of the substrate 13 for preheating it.

C. The lifting mechanism 8 is controlled to adjust the position of the main cladding head 12, so that the first spot is focused on the surface of the substrate 13, and the first spot overlaps with the second spot. The powder device is sprayed to the surface of the substrate 13. The powder is fused on the surface of the substrate 13 through the overlap of the second spot and the first spot. The rotary cylinder 14 is driven by a driving device to rotate at a speed of 1200 rpm, making the relative displacement of the substrate 13 and the main cladding head 12 occur. The second spot keeps the rectangular spot 5*5 mm, and the power is 800 W. The first spot is kept 2 mm round and the power is 2800 W.

D. At the same time, the magnetic field generator generates a magnetic field in the rotary cylinder 14. Under the dual action of lorentz force generated by magnetic field and centrifugal force generated by rotation, the molten pool on the surface of substrate 13 is compressed, and the molten pool with dense structure is formed.

E. The high-speed camera 10 takes the molten pool state. The control system 5 uses the image recognition technology to judge whether the powder melting is sufficient. If the powder melting does not meet the setting requirements, the control system 5 controls the rotary cylinder 14 to reduce the speed.

F. When the substrate 13 rotates once, the lifting mechanism 8 drives the main cladding head 12 to move upward 8 µm for the next cladding according to the lap rate of 90% and the width of single passage 80 µm. The excess powder falls through the through hole at the bottom of the rotary cylinder 14, and gathers in the powder collecting groove 21 through the optical landslide bracket 15.

Figure 6:
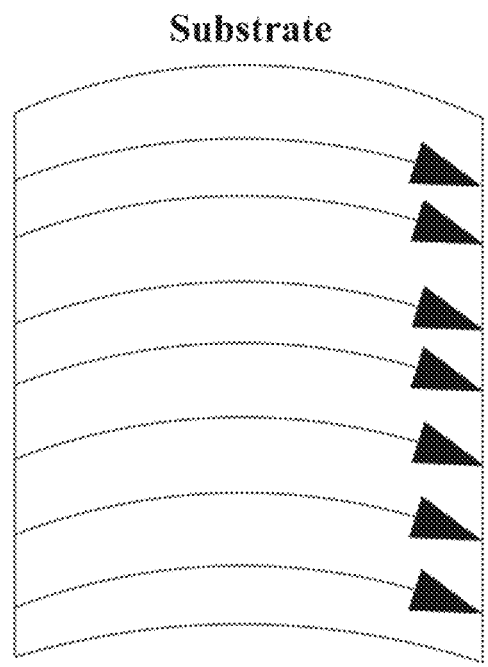
FIG. 6: Laser multi-channel pressing cladding track diagram.

H. Repeat steps D, E and F until the multi-channel cladding of the inner wall of the ring is completed, as shown in FIG. 6.

In the process of ultra-high speed laser cladding, the annular coil 4 constructs the magnetic field with the magnetic induction line down. Rotary cylinder 14 counterclockwise rotation. When the molten powder reaches the surface of substrate 13, the molten pool is pressed under the dual action of Lorentz force and centrifugal force, forming a multi-channel cladding layer with high density and dense structure. The auxiliary laser head 11 provides rectangular light spot. The main cladding head 12 provides high energy circular small light spot. The rectangular light spot covers the circular light spot. The overlapped part can provide higher energy to promote powder melting and improve cladding efficiency. The non-overlapping part can preheat the substrate, reduce the temperature gradient and the residual stress of the cladding layer. It can also repair the cladding layer in the process of multi-channel cladding, improve the quality of the cladding layer and finally form the ultra-thin ring cladding layer with the thickness of 100 µm.

Figure 10A:
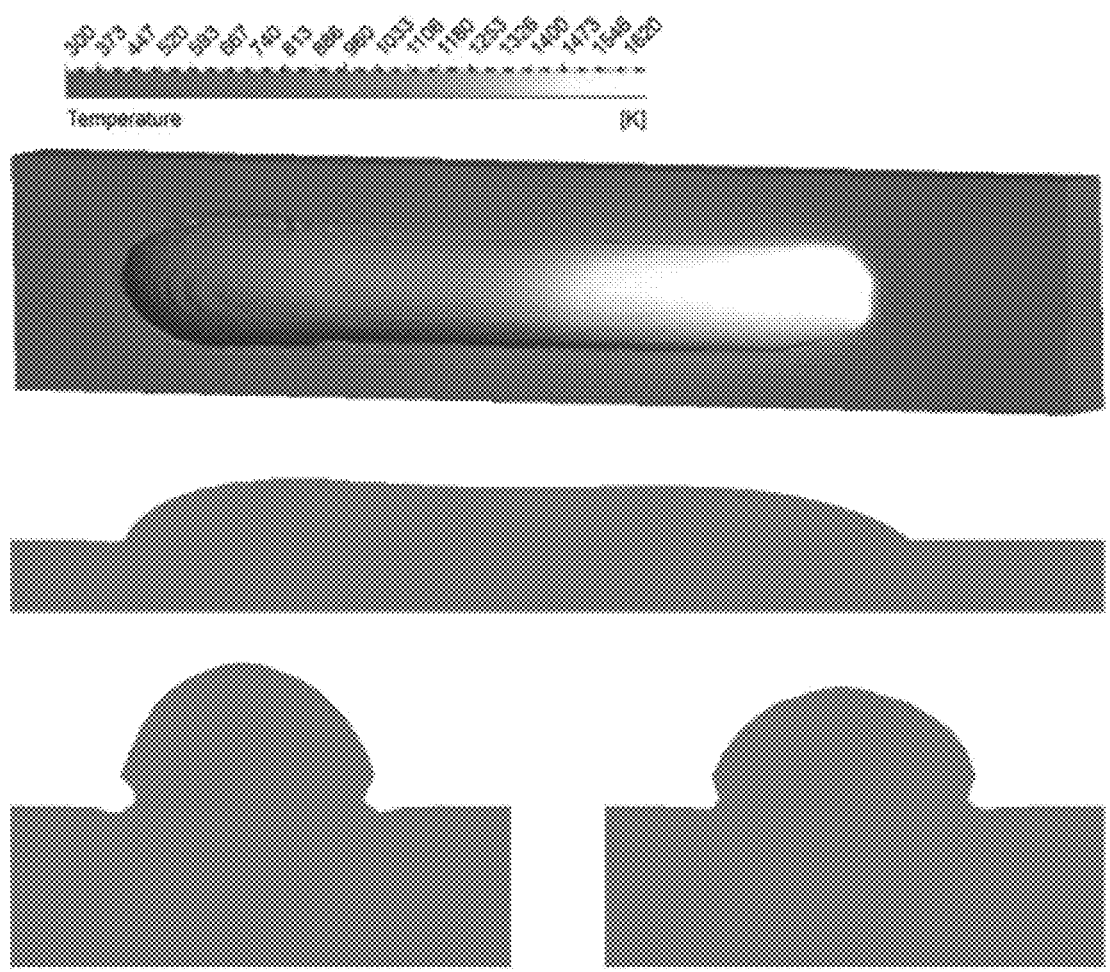
FIGS. 10 A-10B: Simulation diagram of wall pressing cladding.
Figure 10B:
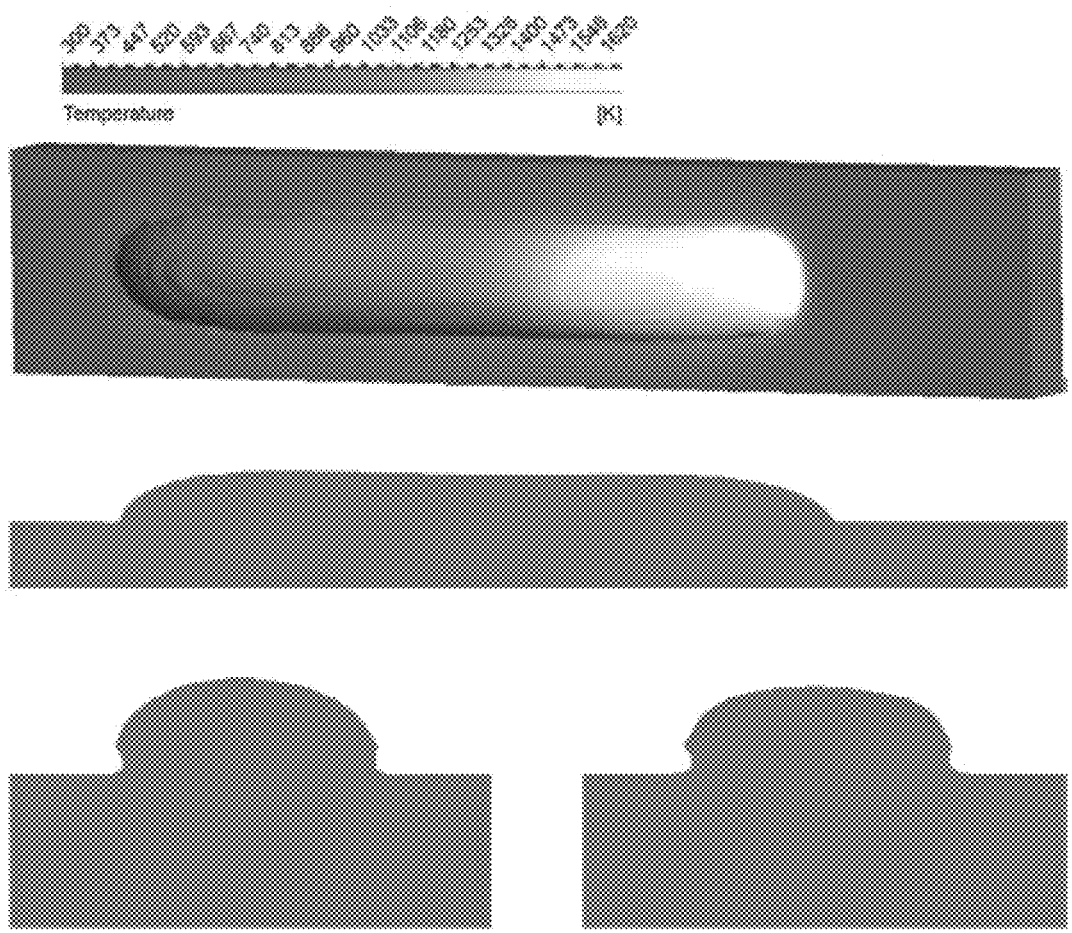

FIG. 10A shows the melt channel of traditional cladding. FIG. 10B is the molten channel of the technological cladding of the present invention. By comparing the height of the two channels, it can be seen that the channel covered by the present invention has a low height, is obviously pressed, and the channel is dense without defects such as pores.

Under the dual action of Lorentz force generated by magnetic field and centrifugal force generated by rotation, the height ΔH of the molten pool pressed on the substrate surface is expressed as:

$$\Delta H = \frac{F_{Lorentz} + F_{Centrifugal} - \frac{K(T_c - T)}{\left(\frac{M}{\rho}\right)^{2/3}}}{\rho g}$$

Among them:

$F_{Lorentz}$ is Lorentz force generated by magnetic field.

$F_{Centrifugal}$ is the centrifugal force generated by rotating.

K is constant.

$T_c$ is the critical temperature.

M is the atomic weight of powder particle.

ρ is the melt density.

T is the molten pool temperature.

When the radius of the cylinder is 0.5 m and the speed is 600 r/min, the centrifugal force is 18 N. When Lorentz force is 15 N, for Incone1625 powder, the atomic weight M is 55, the melt density ρ is 7300 kg/m3, the bath temperature T is 3600° C., it can be calculated that ΔH is about 15 µm.

n is the suppression rate, $$n = \frac{\Delta H}{H}.$$

H is the height of molten pool without pressing. After calculation, the following rules are obtained:

When the sum of centrifugal force and Lorentz force is about 30 N, the suppression rate n is 5%-20%.

When the sum of centrifugal force and Lorentz force is about 80 N, the suppression rate n is 20%-50%.

When the sum of centrifugal force and Lorentz force is more than 80 N, the suppression rate n is more than 50%. It should be understood that, although this specification is described in terms of individual embodiments, not each embodiment contains only an independent technical solution and is stated in this way only for the sake of clarity. The technical personnel in the field shall take the specification as a whole. The technical solutions in each embodiment may be appropriately combined to form other modes of implementation that can be understood by the technical personnel in the field.

The series of detailed descriptions listed above are only specific descriptions of possible embodiments of the present invention. They are not intended to limit the scope of protection of the present invention. All equivalent embodiments or changes made without deviating from the technical spirit of the present invention shall be included in the scope of protection of the present invention.

What is claimed is:

1. A process for using an ultra-high speed laser cladding device, wherein the ultra-high speed laser cladding device comprises a laser generator, a spectrometer, a rotary cylinder and a magnetic field generator, wherein a substrate is installed in the rotary cylinder, the rotary cylinder is rotated through a driving device, the magnetic field generator is configured to generate a magnetic field in the rotary cylinder, the laser generator is configured to produce a first laser beam and a second laser beam through the spectrometer, the first laser beam and the second laser beam have different energy and focus on a surface of the substrate, powder is sprayed to the surface of the substrate, and laser cladding is achieved by the first laser beam and the second laser beam, and the spectrometer is installed on a mobile platform, the magnetic field generator comprises an annular coil, the annular coil is wound outside the rotary cylinder, and the annular coil is energized for generating the magnetic field in the rotary cylinder, the process comprising the following steps:

installing the substrate on the rotary cylinder;

adjusting a position of the auxiliary laser head to make the second light spot focus on the surface of the substrate for preheating the substrate;

adjusting a position of the main cladding head to make the first light spot focus on the surface of the substrate, and make the first light spot overlap with the second light spot, spraying the powder to the surface of the substrate, and fusing the powder on the surface of the substrate through the overlapped part of the second light spot and the first light spot;

driving the rotary cylinder to rotate by the driving device, and at the same time, generating the magnetic field in the rotary cylinder by the magnetic field generator, under a dual action of a Lorentz force generated by a magnetic field and a centrifugal force generated by a rotation, compressing a molten pool on the surface of the substrate to form a high-density molten pool with a dense structure.

2. The process using the ultra-high speed laser cladding device according to claim 1, further comprising the following steps:

taking a molten pool state through a high-speed camera, wherein a control system uses an image recognition technology to judge whether the powder melting is sufficient; if the powder melting does not meet setting requirements, the control system controls the rotary cylinder to reduce a speed.

3. The process using the ultra-high speed laser cladding device according to claim 1, wherein under the dual action of the Lorentz force generated by the magnetic field and the centrifugal force generated by the rotation, a height ΔH of the molten pool pressed on the surface of the substrate is expressed as:

$$\Delta H = \frac{F_{Lorentz} + F_{Centrifugal} - \frac{K(T_c - T)}{\left(\frac{M}{\rho}\right)^{2/3}}}{\rho g}$$

wherein $F_{Lorentz}$ is the Lorentz force generated by the magnetic field, $F_{Centrifugal}$ is the centrifugal force generated by the rotation, K is a constant, Tc is a critical temperature, M is an atomic weight of a powder particle, ρ is a melt density, T is a molten pool temperature.

4. An ultra-high speed laser cladding device comprising a laser generator, a spectrometer, a rotary cylinder and a magnetic field generator, wherein a substrate is installed in the rotary cylinder, the rotary cylinder is rotated through a driving device, the magnetic field generator is configured to generate a magnetic field in the rotary cylinder, the laser generator is configured to produce a first laser beam and a second laser beam through the spectrometer, the first laser beam and the second laser beam have different energy and focus on a surface of the substrate, powder is sprayed to the surface of the substrate, and laser cladding is achieved by the first laser beam and the second laser beam, and the spectrometer is installed on a mobile platform, the magnetic field generator comprises an annular coil, the annular coil is wound outside the rotary cylinder, and the annular coil is energized for generating the magnetic field in the rotary cylinder.

5. The ultra-high speed laser cladding device according to claim 4, wherein an area of a first light spot formed by an output of the first laser beam through a main cladding head is smaller than an area of a second light spot formed by an output of the second laser beam through an auxiliary laser head, and an energy of the first light spot is greater than an energy of the second light spot, an overlapped part of the second light spot and the first light spot is configured to promote powder melting, a non-overlapped part of the second light spot and the first light spot is configured to pre-heat the substrate.

6. The ultra-high speed laser cladding device according to claim 5, wherein a plurality of substrates are uniformly distributed in the rotary cylinder for a synchronous processing of multiple parts.

7. The ultra-high speed laser cladding device according to claim 5, wherein the first laser beam is output through the main cladding head to form a circular light spot, the second laser beam is output through the auxiliary laser head to form a rectangular light spot, the rectangular light spot covers the circular light spot.

8. The ultra-high speed laser cladding device according to claim 7, wherein a plurality of substrates are uniformly distributed in the rotary cylinder for a synchronous processing of multiple parts.

9. The ultra-high speed laser cladding device according to claim 4, wherein molten powder forms a molten pool on the surface of the substrate under an action of the first and second laser beams, the molten pool is compressed under a dual action of a Lorentz force generated by the magnetic field and a centrifugal force generated by a rotation, to form a high-density molten pool with a dense structure.

10. The ultra-high speed laser cladding device according to claim 9, wherein a plurality of substrates are uniformly distributed in the rotary cylinder for a synchronous processing of multiple parts.

11. The ultra-high speed laser cladding device according to claim 9, wherein a bottom surface of the rotary cylinder is evenly distributed with a plurality of through holes for powder falling, a powder collecting groove is arranged below the plurality of through holes, the powder is aggregated into the powder collecting groove through a bracket with a taper, a filter net is arranged above the powder collecting groove for filtering a residue generated during a cladding process.

12. The ultra-high speed laser cladding device according to claim 11, wherein a plurality of substrates are uniformly distributed in the rotary cylinder for a synchronous processing of multiple parts.

13. The ultra-high speed laser cladding device according to claim 4, wherein a plurality of substrates are uniformly distributed in the rotary cylinder for a synchronous processing of multiple parts.

14. The ultra-high speed laser cladding device according to claim 4, wherein a plurality of substrates are uniformly distributed in the rotary cylinder for a synchronous processing of multiple parts.

* * * * *